Patented Aug. 26, 1947

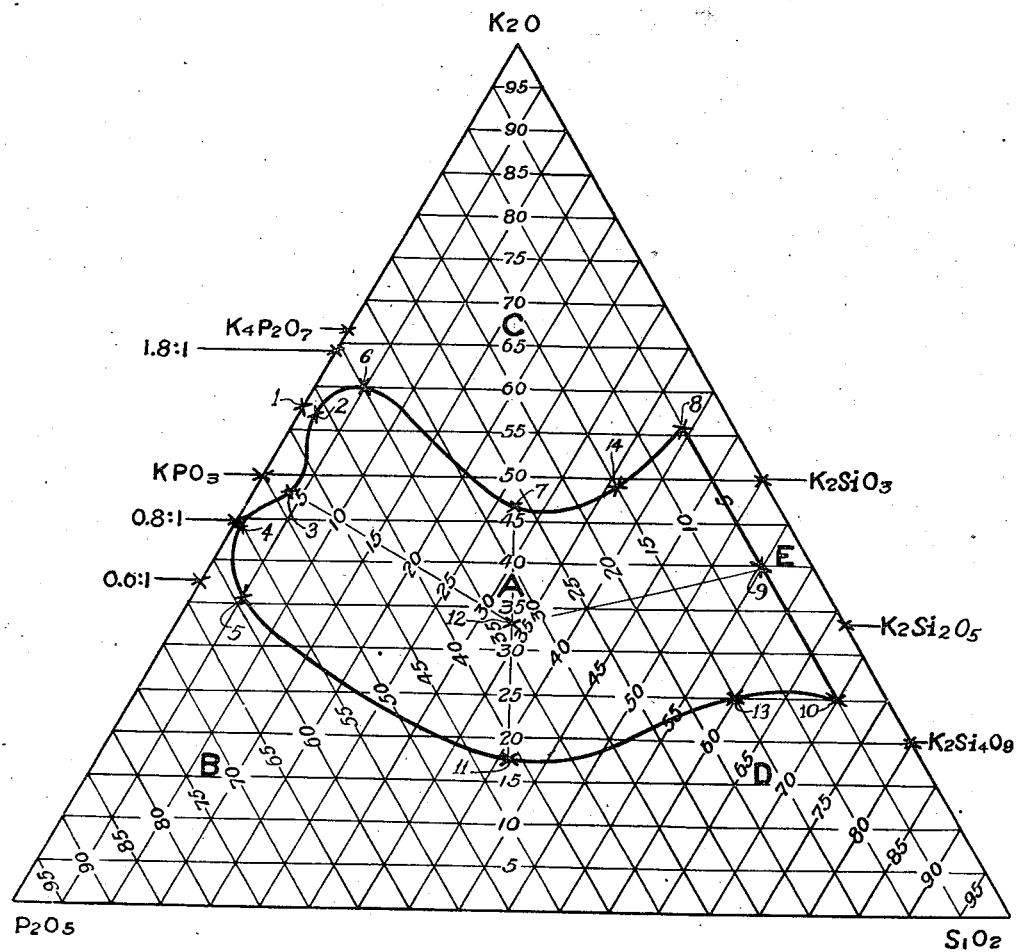

2,426,394

UNITED STATES PATENT OFFICE 2,426,394

WATER-SOLUBLE GLASS COMPOSITION

Ralph E. Hall and Casimir J. Munter, Mount Lebanon, Pa., assignors to Hall Laboratories, Inc., Pittsburgh, Pa., a corporation of Pennsylvania Application April 15, 1943, Serial No. 483,096

6 Claims. (Cl. 252—1)

Our invention relates to glassy compositions and more especially to water soluble glasses containing the oxides of potassium, phosphorus and silicon. The compositions of glasses are generally stated as the over-all proportions of the oxides, and in describing our glassy compositions we will describe them as containing potassium oxide, $K_2O$, phosphorus pentoxide, $P_2O_5$, and silica, $SiO_2$.

The drawing is a ternary graph of the system $K_2O$-$P_2O_5$-$SiO_2$ in which the proportions are indicated in mol per cents. For example; the apex represents 100 mol per cent of $K_2O$. The line along the left-hand boundary of the graph illustrates the varying compositions containing $K_2O$ and $P_2O_5$ only. The potassium metaphosphate composition, $KPO_3$, is at a point representing 50 per cent each of $K_2O$ and $P_2O_5$, since it may be represented as formed of 1 mol each of $K_2O$ and of $P_2O_5$.

Our invention will first be described with particular reference to glassy compositions consisting principally of $K_2O$ and $P_2O_5$ with relatively small modifying $SiO_2$ additions.

Referring to the drawing, potassium oxide, $K_2O$, and phosphorus pentoxide, $P_2O_5$, form a series of compositions ranging from $K_2O$ to $P_2O_5$ along the left-hand boundary of the ternary graph. Certain of these compositions appear to be definite chemical compounds which can exist in crystalline form, including the orthophosphate, $K_3PO_4$, the pyrophosphate $K_4P_2O_7$, and the metaphosphate, $KPO_3$. The orthophosphate and pyrophosphate crystals are readily water soluble and have been used for various purposes, including the making of potassium soap solutions. If the orthophosphate and pyrophosphate are cooled, even with drastic quenching from a melt, a crystalline product results. The metaphosphate, $KPO_3$, may be obtained in either crystalline or glassy form. The crystalline form is very difficultly soluble. When a melt of the metaphosphate composition is cooled, it tends to go to the crystalline form unless extremely drastic quenching is employed. If the melt is subjected to extremely drastic quenching, such, for example, as quenching in a thin layer between two chilled metal plates, a glass may be obtained. This glass is readily and extensively water soluble. It is, however, highly hygroscopic and difficult to handle and store.

The metaphosphate has a molar ratio of $K_2O$ to $P_2O_5$ of 1:1 and the pyrophosphate a molar ratio of 2:1. Melts having proportions of $K_2O$ to $P_2O_5$ between ratios of 1:1 and about 1.8:1 resemble the metaphosphate in that they tend to form a crystalline mass unless very drastically quenched. Such crystalline mass consists partly of the insoluble crystalline metaphosphate and partly of the soluble crystalline pyrophosphate, the relative amounts depending upon the proportions of $K_2O$ to $P_2O_5$. Such crystalline masses will always contain some of the insoluble crystalline metaphosphate.

Compositions having $K_2O$ to $P_2O_5$ molar ratios between 1:1 and about 0.8:1 exhibit properties similar to those of the metaphosphate in that they tend to become crystalline upon cooling unless drastically quenched, forming a mass consisting principally of insoluble metaphosphate crystals plus a small amount of phosphorus pentoxide. Compositions, however, having a molar ratio of $K_2O$ to $P_2O_5$ of less than about 0.8:1 form glasses upon moderately rapid cooling, the glass-forming tendency increasing as the $P_2O_5$ content increases. These glasses, however, are acid in character and are very slowly soluble.

To summarize; there is a range which includes the orthophosphate and pyrophosphate in which the materials are obtained in the form of readily water soluble crystals which are definitely alkaline. There is another range of compositions richer in $P_2O_5$ than the metaphosphate and extending to $P_2O_5$ itself, in which the materials tend to form glasses, but the glasses are distinctly acid and difficultly soluble. There is an intermediate range between the $K_2O$ to $P_2O_5$ molar ratios of about 1.8 and 0.8 in which glasses may be formed, but unless the compositions in this range are subjected to extremely drastic quenching they form upon cooling from a melt a crystalline mass which consists principally or partially of insoluble crystalline metaphosphate, the proportion of the metaphosphate depending upon the ratio $K_2O$ to $P_2O_5$. These materials range from a slight acidity at the 0.8 ratio through neutrality to moderate alkalinity at the 1.8 ratio, and should be very useful for certain water-conditioning purposes if they could be made soluble, but heretofore this has involved manufacturing difficulties such as necessity for extremely drastic quenching which is not readily attainable in practical commercial manufacturing operations. The compositions in the range between molar ratios of $K_2O$ to $P_2O_5$ of about 0.8:1 and 0.6:1 form glasses quite readily upon moderate quenching, but such glasses are difficultly soluble and increasingly so as the molar ratio of $K_2O$ to $P_2O_5$ decreases. They are very hygroscopic and quite acid.

We have found that if the potassium phosphates in the above-mentioned range of molar ratios of $K_2O$ to $P_2O_5$ of about 1.8 to .8 be modified by the addition of a small amount of silica, $SiO_2$, to the melt, readily soluble glass may be obtained with moderate chilling. We have also found that if the potassium phosphates having molar ratios of $K_2O$ to $P_2O_5$ of from about 0.8:1 to 0.6:1 be modified with the addition of a small amount of silica to the melt, the rate of solution of the glasses obtained is increased.

There is a eutectic between the potassium metaphosphate and pyrophosphate occurring at a molar ratio of $K_2O$ to $P_2O_5$ of about 1.35. This corresponds to a mol per cent of about 57.5 $K_2O$ and 42.5 of $P_2O_5$. The eutectic is represented by point 1 on the graph. At and in the immediate vicinity of this eutectic a minimum of about 2 mol per cent of silica is required to produce a composition which forms a glass upon moderate chilling, as by pouring the melt in a layer of about ⅛ to ¼ of an inch thick upon a metal plate at room temperature. Such composition is represented by the point 2 and contains in mol per cent about 56% $K_2O$, 42% $P_2O_5$ and 2% $SiO_2$. At a composition corresponding to the metaphosphate $KPO_3$, a somewhat larger amount of silica is required, in the neighborhood of about 4 mol per cent. Such composition is represented by the point 3 and contains in mol per cent about 48% $K_2O$, 48% $P_2O_5$ and 4% $SiO_2$. If the molar ratio of $K_2O$ to $P_2O_5$ is decreased below the 1:1 ratio of the metaphosphate, the requisite amount of silica to cause the formation of a glass upon moderate chilling decreases until a minimum of about 1 mol per cent is required at a $K_2O$ to $P_2O_5$ ratio of 0.8. Such composition is represented by the point 4 and contains in mol per cent about 44% $K_2O$, 55% $P_2O_5$ and 1% $SiO_2$. If the molar ratio of $K_2O$ to $P_2O_5$ is decreased below the 0.8:1 ratio, the silica addition is not required for its glass-forming properties, but is useful in making the glass in such range more soluble. There is, however, not much use in silica additions to compositions having a $K_2O$ to $P_2O_5$ ratio below about .6 because of the difficulties in dissolving such glasses, even with silica additions, and their great acidity. Point 5 on the graph represents a composition having a $K_2O$ to $P_2O_5$ molar ratio of .6 and containing 5% $SiO_2$. Such composition contains in mol per cent about 36% $K_2O$, 59% $P_2O_5$ and 5% $SiO_2$.

At the other side of the eutectic point 1, namely, at ratios of $K_2O$ to $P_2O_5$ greater than 1.35, the minimum amount of silica required to form a glass upon moderate quenching increases until in the neighborhood of 5 mol per cent is required at a 1.8 ratio. Such composition is represented by the point 6 and contains in mol per cent about 60% $K_2O$, 35% $P_2O_5$ and 5% $SiO_2$. At a $K_2O$ to $P_2O_5$ ratio above about 1.8 the minimum amount of silica required increases very rapidly so that above about 1.8 it is practically impossible to obtain melts which form glasses even with drastic quenching.

In the graph the portion of the boundary of the area A which lies along the points 6—2—3—4—5 illustrates in graphic form approximately the minimum amounts of $SiO_2$ required to attain compositions which are glass-forming upon moderate chilling between the $K_2O$ and $P_2O_5$ ratios of 1.8 and .8 and to render more rapidly soluble the acid glasses in compositions between the ratios of .8 and .6. While, for purposes of graphic illustration, it is necessary to show the boundary of the region A between the points 6—2—3—4—5 as a definite line, it will be understood that the line is intended to indicate the order of magnitude of the minimum amounts of silica employed, since the minimum amount will vary somewhat depending upon the quickness of the chill which can be obtained in manufacturing operations such as by pouring or dropping a melt of the composition ranges between the ratios of 1.8 and .8, upon water- or air-cooled plates or conveyors or between cooled rolls and the degree of increased rate of solution desired in compositions between the ratios of .8 and .6. The maximum amount of silica to be used depends upon the uses to which the glass is to be put. Where the maximum calcium sequestering or repressing properties of the potassium phosphate glass are desired, a minimum amount of silica is added to the melt so that such compositions will fall along the curve 6—2—3—4—5 of the drawing or slightly above it. Where the glass is to be used primarily for its calcium sequestering or repressing properties, the preferred composition lies at or in the neighborhood of the eutectic having a $K_2O$ to $P_2O_5$ molar ratio of 1.35 because of the minimum amount of silica required and because of the lower melting point of the eutectic composition. Where the calcium sequestering or repressing properties of the potassium phosphate glass are the main desideratum, the silica should not exceed about 7 mol per cent.

The invention, however, is not limited to compositions lying along that part of the boundary of the region A which lies between the points 6—2—3—4—5 adjacent to the $K_2O$-$P_2O_5$ boundary, since compositions having much higher proportions of silica are useful for many purposes, particularly where calcium sequestration or repression is not especially important.

For use as a boiler compound where it is desirable to introduce silica into the boiler water, the silica content may be increased considerably above the minimum required for making a readily producible glass. Such higher silica compositions lie in the middle or toward the right-hand side of the area A depending upon the relative proportion of silica to the phosphorus pentoxide desired. These higher silica glasses are readily water soluble. Where the glass is to be used in detergent compositions, the compounds will lie within the upper part of the area A indicated in the diagram, that is, within the area 6—7—8—9—12—3, since these compositions are alkaline. Where calcium sequestration in a detergent is desired, the compositions will lie in the left-hand part of the upper region, that is, within the area 6—7—12—3—2, whereas if alkalinity is the prime consideration, the compositions will lie toward the right-hand side of the upper part of the region A, that is, within the area 7—8—9—12. The compositions in the lower part of the region A, that is, within the area 3—12—9—10—11—5—4, and particularly at the left-hand side thereof, that is, within the area 3—12—11—5—4, are acid glasses and may be used for purposes such as the tanning of leather.

The mol per cent of $K_2O$, $P_2O_5$ and $SiO_2$ in the compositions represented by points, 1, 2, 3, 4, 5 and 6 have been given. In order that the mol per cents of compositions represented on the graph by the points may be readily available, the compositions as taken from the graph, are tabulated in the following table.

Table

| Point | Mol Per Cent | | |
|---|---|---|---|
| | $K_2O$ | $P_2O_5$ | $SiO_2$ |
| 1 | 57.5 | 42.5 | none |
| 2 | 56 | 42 | 2 |
| 3 | 48 | 48 | 4 |
| 4 | 44 | 55 | 1 |
| 5 | 36 | 59 | 5 |
| 6 | 60 | 35 | 5 |
| 7 | 47 | 26.5 | 26.5 |
| 8 | 56 | 5 | 39 |
| 9 | 40 | 5 | 55 |
| 10 | 25 | 5 | 70 |
| 11 | 18 | 41 | 41 |
| 12 | 32 | 34 | 34 |
| 13 | 25 | 15 | 60 |
| 14 | 49 | 15 | 36 |

Within the area A there are certain compositions at which the constituents can be completely fused at temperatures lower than those of the surrounding compositions. There are, for example, ternary eutectics which have relatively low fusion temperatures, and there are also boundaries between the regions of stability for the various compounds which have fusion temperatures lower than those of adjoining composition. In general, the compositions which it is preferred to make commercially will coincide with or lie near those regions of lower melting point because of greater ease of manufacture. While the glasses at the left-hand side of the area A may be considered as primarily potassium phosphate glasses, modified by silica additions, the glasses at the right-hand side of the area A may be considered as primarily silicate or potassium-silicate glasses modified by the presence of $P_2O_5$.

Any composition desired in the area A can be obtained by a selection of any combination of starting materials that will yield the final composition sought. The starting materials are fused to a fluid melt which is cooled to form the glasses which lie within the area A. Fairly rapid chilling is required to produce glasses in the region at the left-hand side of the area A, particularly in the upper left-hand corner thereof; however, toward the middle and right-hand side of the area, the compositions are readily obtained as glasses with less rapid cooling.

The region C at the apex of the triangular diagram of the drawing is the region in which the materials are crystalline and is therefore excluded. The region D at the lower right-hand corner of the triangle is the region in which glasses may be formed but require excessively high temperatures for their formation and such glasses are difficultly soluble and is therefore excluded. The region B at the lower left-hand corner of the triangle is a region in which glasses may be formed but such glasses have a very slow rate of solution and are very acid and hence this region is excluded. The narrow band E along the right-hand side of the triangle is excluded from our area A because in the compositions falling within such band the $P_2O_5$ is too small to be a real characterizing element of the composition. However, in the extreme right side of the area A, that is, within the area 14—8—9—10—13, where the composition is predominantly $K_2O$ and $SiO_2$, the $P_2O_5$ content imparts certain calcium sequestering properties to the composition, tends to make the composition more soluble, particularly in the high silica ranges, decreases the viscosity of the melt which makes for easier casting and lowers the fusion temperature, which is of particular advantage in the vicinity of the higher melting compositions, near the potassium metasilicate, $K_2SiO_3$, and potassium disilicate, $K_2Si_2O_5$, compositions.

The compositions which we desire to cover within the broader scope of our invention fall within the area A of the drawing, although the preferred compositions lie in that part of the area A which is adjacent the line 6—2—3—4—5.

The choice of materials to be fused together to produce the desired composition will be dictated both by the cost of the raw materials and by the convenience in using them. The cheapest source of silica is silica sand, commonly used in the manufacture of silicate glasses; however, we may use a potassium silicate as a source of silica as well as potassium. As our source of potassium oxide we may use potassium chloride, potassium hydroxide or potassium carbonate. The chloride, however, will not be used in the production of the more alkaline products. As a source of $P_2O_5$ we may use the phosphorus pentoxide itself, produced by the burning of phosphorus, or we may use the phosphoric acids derived from $P_2O_5$, or we may use any suitable potassium phosphate or mixtures thereof. These materials are mixed and fused in a furnace and maintained in a molten condition until the uniform composition is secured. The melt is taken from the furnace and chilled to form a glass or super-cooled liquid. The chilling need not be drastic and may be carried out by the usual commercial methods such as pouring or dropping the material onto a metal plate, a traveling metal conveyor or passing it between metal rolls. The metal plates or rolls should be air- or water-cooled.

While the invention has been described in connection with compositions consisting of three constituents, $K_2O$, $P_2O_5$ and $SiO_2$, the compositions may contain other materials so long as they are not subversive to the production of readily water soluble glasses which are useful for the purposes intended; for example, other glass-forming oxides, such as boric oxide or metal oxides, added as modifiers, may be incorporated into the melts in minor proportions.

While we have specifically described our invention, it is to be understood that the invention is not limited to its preferred embodiment or to the details of the foregoing description but may be otherwise embodied and practiced within the scope of the following claims.

We claim:

1. A modified potassium phosphate glass having a molar ratio of $K_2O$ to $P_2O_5$ of between about 1.8:1 to 0.6:1 and containing at least one mol per cent of $SiO_2$.

2. A modified potassium phosphate glass having a molar ratio of $K_2O$ to $P_2O_5$ of between about 1.8:1 to 0.6:1 and containing about 1 to 7 mol per cent of $SiO_2$.

3. A water-soluble glass consisting essentially of $K_2O$, $P_2O_5$ and $SiO_2$, the composition of the glass, when represented in mol per cent being so selected that in the ternary graph of the system, $K_2O$-$P_2O_5$-$SiO_2$, it lies substantially within the polygon defined by the points 60% $K_2O$, 35% $P_2O_5$, 5% $SiO_2$; 47% $K_2O$, 26.5% $P_2O_5$, 26.5% $SiO_2$; 56% $K_2O$, 5% $P_2O_5$, 39% $SiO_2$; 40% $K_2O$, 5% $P_2O_5$, 55% $SiO_2$; 25% $K_2O$, 5% $P_2O_5$, 70% $SiO_2$; 18% $K_2O$, 41% $P_2O_5$, 41% $SiO_2$; 36% $K_2O$, 59% $P_2O_5$, 5% $SiO_2$; 44% $K_2O$, 55% $P_2O_5$, 1% $SiO_2$; 48% $K_2O$; 48% $P_2O_5$, 4% $SiO_2$; 56% $K_2O$, 42% $P_2O_5$, 2% $SiO_2$.

4. A water-soluble glass consisting essentially of $K_2O$, $P_2O_5$ and $SiO_2$, the composition of the glass, when represented in mol per cent being so selected that in the ternary graph of the system, $K_2O$-$P_2O_5$-$SiO_2$, it lies substantially within the polygon defined by the points 60% $K_2O$, 35% $P_2O_5$, 5% $SiO_2$; 47% $K_2O$, 26.5% $P_2O_5$, 26.5% $SiO_2$; 32% $K_2O$, 34% $P_2O_5$, 34% $SiO_2$; 48% $K_2O$, 48% $P_2O_5$, 4% $SiO_2$; 56% $K_2O$, 42% $P_2O_5$, 2% $SiO_2$.

5. A water-soluble glass consisting essentially of $K_2O$, $P_2O_5$ and $SiO_2$, the composition of the glass, when represented in mol per cent being so selected that in the ternary graph of the system, $K_2O$-$P_2O_5$-$SiO_2$, it lies substantially within the polygon defined by the points 47% $K_2O$, 26.5% $P_2O_5$, 26.5% $SiO_2$; 56% $K_2O$, 5% $P_2O_5$, 39% $SiO_2$; 40% $K_2O$, 5% $P_2O_5$, 55% $SiO_2$; 32% $K_2O$, 34% $P_2O_5$, 34% $SiO_2$.

6. A water-soluble glass consisting essentially of $K_2O$, $P_2O_5$ and $SiO_2$, the composition of the glass, when represented in mol per cent being so selected that in the ternary graph of the system, $K_2O$-$P_2O_5$-$SiO_2$, it lies substantially within the polygon defined by the points 49% $K_2O$, 15% $P_2O_5$, 36% $SiO_2$; 56% $K_2O$, 5% $P_2O_5$, 39% $SiO_2$; 40% $K_2O$, 5% $P_2O_5$, 55% $SiO_2$; 25% $K_2O$, 5% $P_2O_5$, 70% $SiO_2$; 25% $K_2O$, 15% $P_2O_5$, 60% $SiO_2$.

RALPH E. HALL.
CASIMIR J. MUNTER.

REFERENCES CITED

The following references are of record in the file of this patent:

UNITED STATES PATENTS

| Number | Name | Date |
|---|---|---|
| 2,304,850 | Rice | Dec. 15, 1942 |
| 2,235,955 | Williams | Mar. 25, 1941 |
| 2,315,995 | Williams | Apr. 6, 1943 |